United States Patent
Klomsdorf et al.

(10) Patent No.: US 11,343,780 B2
(45) Date of Patent: May 24, 2022

(54) METHOD AND CIRCUIT FOR DETERMINING AN ADDITIONAL MAXIMUM POWER REDUCTION FOR DUAL CARRIER OPERATION

(71) Applicant: Motorola Mobility LLC, Chicago, IL (US)

(72) Inventors: Armin Klomsdorf, Chicago, IL (US); Brian Bremer, Arlington Heights, IL (US)

(73) Assignee: Motorola Mobility LLC, Chicago, IL (US)

( * ) Notice: Subject to any disclaimer, the term of this patent is extended or adjusted under 35 U.S.C. 154(b) by 390 days.

(21) Appl. No.: 16/542,273

(22) Filed: Aug. 15, 2019

(65) Prior Publication Data

US 2021/0051607 A1    Feb. 18, 2021

(51) Int. Cl.
| | | |
|---|---|---|
| *H04W 52/36* | (2009.01) | |
| *H04W 52/08* | (2009.01) | |
| *H04W 52/24* | (2009.01) | |
| *H04L 5/14*  | (2006.01) | |
| *H04W 52/10* | (2009.01) | |
| *H04W 88/06* | (2009.01) | |

(52) U.S. Cl.
CPC .............. *H04W 52/367* (2013.01); *H04L 5/14* (2013.01); *H04W 52/08* (2013.01); *H04W 52/10* (2013.01); *H04W 52/245* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2009/0176454 A1* | 7/2009 | Chen ...................... | H04B 15/00 455/63.1 |
| 2012/0062431 A1* | 3/2012 | Tikka .................... | H04B 1/0458 343/703 |
| 2012/0207032 A1* | 8/2012 | Chen ...................... | H04W 16/14 370/252 |
| 2020/0260462 A1* | 8/2020 | Elad .................. | H04W 72/0473 |

OTHER PUBLICATIONS

Sprint, "WF on Rel-16 Improvement of A-MPR for B41/n41 EN-DC", R4-1902498, for 3GPP TSG RAN WG4 #90 Meeting, Athens, Greece, Feb. 25-Mar. 1, 2019.

* cited by examiner

*Primary Examiner* — Shripal K Khajuria
(74) *Attorney, Agent, or Firm* — Loppnow & Chapa

(57) ABSTRACT

The present application provides a method and a circuit for determining an additional maximum power reduction for conforming to emission requirements for dual carrier operation, where each carrier has an associated respective one of multiple different radio access technologies, and where each of the multiple different radio access technologies uses a different antenna. The method includes associating in a wireless communication device each one of at least a pair of antennas with a different radio access technology for supporting communications between the wireless communication device and at least a first wireless network. An amount of isolation is identified between the at least pair of antennas. A minimum level of the additional is maximum power reduction needed for conforming to the emission requirements is determined, based on the identified amount of isolation.

17 Claims, 8 Drawing Sheets

METHOD AND CIRCUIT FOR DETERMINING AN ADDITIONAL MAXIMUM POWER REDUCTION FOR DUAL CARRIER OPERATION

FIELD OF THE APPLICATION

The present disclosure relates generally to determining additional maximum power reduction for conforming to emission requirements, and more particularly, to additional maximum power reduction for dual carrier operation based upon a determined amount of antenna isolation.

BACKGROUND

Presently, user equipment, such as wireless communication devices, communicate with other communication devices using wireless signals, such as within a network environment that can include one or more cells within which various communication connections with one or more networks and other devices operating within the network(s) can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In order to support greater data throughput, service providers have been increasingly looking at techniques which extend the available bandwidth that is allowed to be used by a particular user within the system. At least a couple of bandwidth extending techniques include the use of carrier aggregation and/or dual carrier, where multiple frequency bands are selected to operate together. For example, by utilizing more than one carrier through carrier aggregation it may be possible to increase the overall transmission bandwidth associated with a particular data channel and correspondingly enhance the data capacity of that channel. Additionally and/or alternatively, a dual or multiple carrier approach can allow two or more spectrum allocations to be paired and/or used in parallel, including spectrum allocations alternatively associated with different standards and/or radio access technologies, which can also be used to support the ability of enhanced and/or more robust data throughput.

Such a possibility might better support the beginning stages of adoption for a particular standard, where area coverage for the emerging standard at least initially may be less than complete. During such a period of transition, it may be beneficial to better support the transition to an emerging standard by allowing bearers for the new standard to be supported in conjunction with the infrastructure of the more mature or previously established standard, and/or to supplement coverage of the emerging standard with coexisting communications using the more established standard.

However, the coexistence of communications via multiple carriers can sometimes result in the mixing in the radio of the two separate sets of signals, whereby intermodulation products from transceiver non-linearity can cause spurious and/or unwanted signaling in unintended signal frequencies. There are rules which limit the amount of power a device is allowed to spill over into an unintended spectrum space, and depending upon how much information is shared between each of the at least two radio access technologies, it may be difficult to predict or control an amount of power produced as part of the resulting intermodulation products. The operating levels of multiple carriers, depending upon the degree of isolation can also sometimes contribute to self desense if the levels of interaction coupled with the overall levels of operation exceed a predetermined known problematic amount.

In some instances, in absence of information concerning an actual amount of power being conveyed by resulting intermodulation products into an unintended spectrum space, a device may rely upon worst case estimates, which likely exceed any actual amount of undesired power that might be being generated. As such, it may not always be clear how much attenuation is necessary in instances where the system that is tasked with deciding how much attenuation to apply to itself does not know the exact nature of the interaction between the multiple potential signals. For example, the present inventors have recognized that one of the factors that affects the amount of additional maximum power reduction in order to avoid unwanted effects includes an ability to estimate the amount of isolation between the multiple antennas. In absence of a reasonable approximation or an otherwise determined amount, a conservative calculation may need to make use of a worst case estimate, in order to avoid the possibility of signal levels in the unintended spectrum space that exceeds the allowed amounts.

The present inventor have recognized that by providing a circuit and methods for measuring the amount of isolation between the multiple antennas of interest, a better approximation of an actual amount of isolation instead of an assumed worst case estimate may be used, which may avoid at least some of the additional maximum power reduction that is intended to serve as a buffer to insure that the alternative use of a worst case possible effect does not contribute to an amount of intermodulation products or self desense that exceeds the actual amounts needed for the device to operate within acceptable operating limits.

SUMMARY

The present application provides a method for determining an additional maximum power reduction for conforming to emission requirements for dual carrier operation, where each carrier has an associated respective one of multiple different radio access technologies, and where each of the multiple different radio access technologies uses a different antenna. The method includes associating in a wireless communication device each one of at least a pair of antennas with a different radio access technology for supporting communications between the wireless communication device and at least a first wireless network. An amount of isolation is identified between the at least pair of antennas. A minimum level of the additional maximum power reduction needed for conforming to the emission requirements is determined, based on the identified amount of isolation.

In at least one embodiment, identifying an amount of isolation between the at least pair of antennas can include making a closed loop determination between the different antennas being used by each of the different radio access technologies as part of the dual carrier operation. In at least some of these instances, making a closed loop determination can include transmitting a signal via a first one of the at least pair of antennas using the associated radio access technology, and receiving the transmitted signal via a second one of the at least pair of antennas, wherein the identified amount of isolation is a function of a signal strength of the signal being transmitted and a signal strength of the signal being received.

In at least a further embodiment, identifying an amount of isolation between the at least pair of antennas includes making an open loop determination. In at least some of these instances, making the open loop determination can include accessing a table having one or more predetermined amounts of antenna isolation, each predetermined amount being associated with one or more corresponding detectable use conditions or modes of operation. Further, making the open loop determination can include detecting using one or more sensors any associated current use conditions or modes of operation.

The present application further provides a circuit for determining an additional maximum power reduction for conforming to emission requirements for dual carrier operation, where each carrier has an associated respective one of multiple different radio access technologies, and where each of the multiple different radio access technologies uses a different antenna. The circuit includes at least a pair of antennas, a transmitter coupled to a first one of the at least pair of antennas, and a receiver coupled to a second one of the at least pair of antennas. The circuit further includes a controller that identifies an amount of isolation between the at least pair of antenna, and determines a minimum level of the additional maximum power reduction needed for conforming to the emission requirements, based on the identified amount of isolation.

In at least one embodiment, the receiver can be a feedback measurement receiver, that is coupled to the second one of the at least pair of antennas via a signal coupler.

In at least a further embodiment, the circuit can further include one or more sensors for detecting one or more current use conditions or modes of operation, and a table having one or more predetermined amounts of antenna isolation, each predetermined amount being associated with one or more corresponding detectable use conditions or modes of operation.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 1:
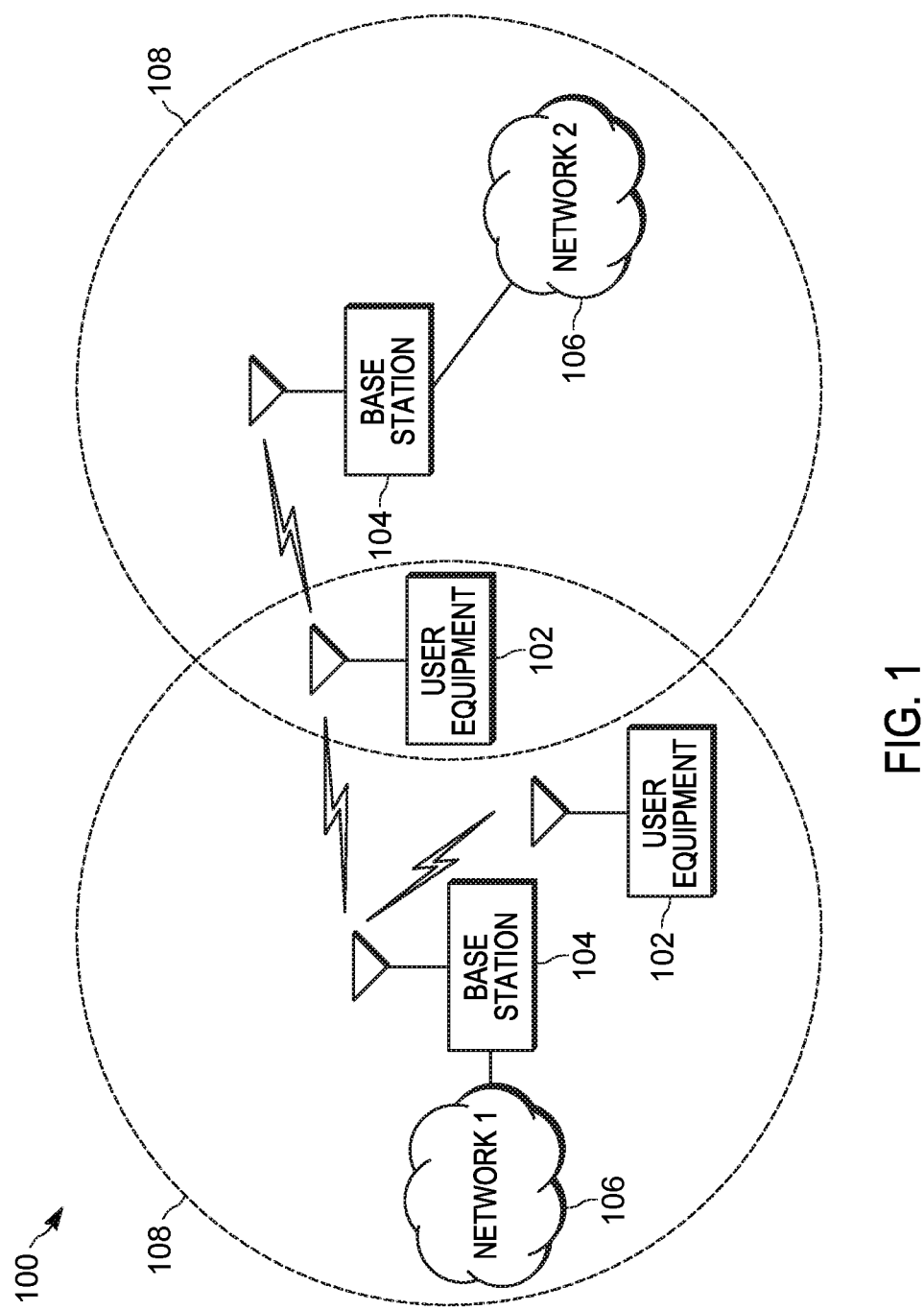
FIG. 1 is a block diagram of an exemplary network environment.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

FIG. 1 illustrates a block diagram of an exemplary network environment 100. The exemplary network environment 100 can include one or more wireless communication devices, such as user equipment 102, which might communicate directly with one another, or via one or more networks, each having an associated network infrastructure. For example, the network infrastructure can include one or more base stations 104, which in turn are coupled to other network elements, which correspond to one or more networks, and which are generally represented as clouds labeled network 106. The various base stations 104 can be associated with the same network or can be separately associated with different networks.

A base station 104 will generally have an expected associated area 108 of coverage, which defines the area over which wireless radio frequency signaling from the base station can generally reach. While the strength of wireless radio frequency signaling is generally affected by the range of transmission, within an expected area of coverage, terrain and/or other physical elements can impact the ability of the signaling to be perceived at particular locations within the expected area 108 of coverage. Depending upon the reception capabilities of the user equipment 102, the current signal strength of the signal being transmitted at a particular location will affect whether a particular user equipment 102 can send or receive data with a particular base station 104. As such, some networks 106 will make use of multiple geographically spaced apart base stations 104, to provide communication capabilities across a larger geographical area.

It is further possible that different base stations 104 can be more directly associated with different networks 106, which may interact with one another at different parts of the respective networks. The network(s) 106 can include any type of network that is capable of conveying signals between different associated elements of the network including the one or more user equipment 102.

In some instances, the user equipment 102 is generally a wireless communication device that could take the form of a radio frequency cellular telephone. However, the user equipment 102 could also take the form of other types of devices that could support wireless communication capabilities. For example, the different potential types of user equipment can include a tablet, a laptop computer, a desktop computer, a netbook, a cordless telephone, a selective call receiver, a gaming device, a personal digital assistant, as well as any other type of wireless communication device that might be used to support wireless forms of communication.

The various networks 106, base stations 104 and user equipment 102 could be associated with one or more different communication standards. A few examples of different communication standards that a particular network 106 could support include Global System for Mobile Communications (GSM) Code Division Multiple Access (CDMA), Orthogonal Frequency Division Multiple Access (OFDMA), Long Term Evolution (LTE), New Radio Access Technology (NR), Global Positioning System (GPS), Wi-Fi (IEEE 802.11), as well as various other communication standards. It is possible that each network and/or associated element could support one or more different communication standards. It is also possible that different networks 106 can support one or more of the same standards.

In addition, the wireless communication devices 102, base stations 104 and networks 106 may utilize a number of additional various forms of communication and communication techniques including beamforming, signal diversity, and simultaneous voice and data that concurrently enables the use of simultaneous signal propagation. The wireless communication devices 102, base stations 104 and networks may further utilize carrier aggregation, and/or dual connectivity, which can include the simultaneous use of multiple adjacent carriers, that each can allow for the use of a different wireless communication technology, that is respectively used in conjunction with one or more communication networks.

Figure 2:
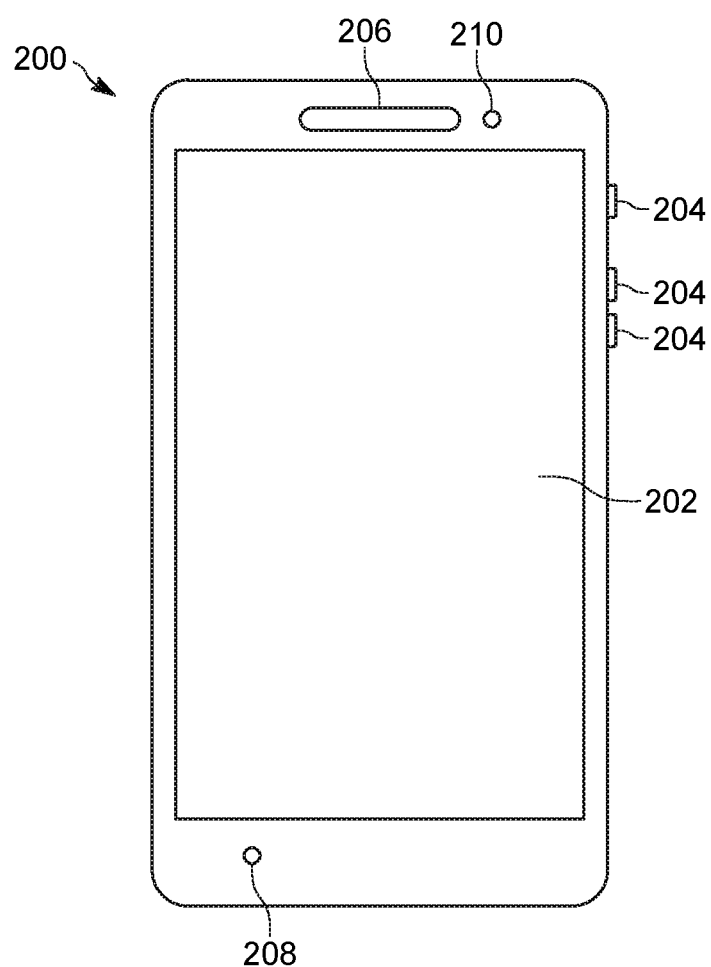
FIG. 2 is a front view of an exemplary user equipment in the form of a wireless communication device, such as a radio frequency radio telephone.

FIG. 2 illustrates a front view 200 of an exemplary user equipment 102 in the form of a wireless communication device, such as a radio frequency radio telephone. In the illustrated embodiment, the radio frequency cellular telephone includes a display 202 which covers a large portion of the front facing. In at least some instances, the display can incorporate a touch sensitive matrix, that can help facilitate the detection of one or more user inputs relative to at least some portions of the display, including an interaction with visual elements being presented to the user via the display 202. In some instances, the visual elements could include an object with which the user can interact. In other instances, the visual elements can form part of a visual representation of a keyboard including one or more virtual keys and/or one or more buttons with which the user can interact and/or select for a simulated actuation. In addition to one or more virtual user actuatable buttons or keys, the device can include one or more physical user actuatable buttons 204. In the particular embodiment illustrated, the device has three such buttons located along the right side of the device.

The exemplary wireless communication device, illustrated in FIG. 2, additionally includes a speaker 206 and a microphone 208 in support of voice communications. The speaker 206 may additionally support the reproduction of an audio signal, which could be a stand-alone signal, such as for use in the playing of music, or can be part of a multimedia presentation, such as for use in the playing of a movie, which might have at least an audio as well as a visual component. The speaker 206 may also include the capability to also produce a vibratory effect. However, in some instances, the purposeful production of vibrational effects may be associated with a separate element, not shown, which is internal to the device. Generally, the speaker 206 is located toward the top of the device, which corresponds to an orientation consistent with the respective portion of the device facing in an upward direction during usage in a portrait orientation in support of a voice communication. In such an instance, the speaker 206 might be intended to align with the ear of the user, and the microphone 208 might be intended to align with the mouth of the user. Also located near the top of the device, in the illustrated embodiment, is a front facing camera 210. The wireless communication device will also generally include one or more radio frequency transceivers, as well as associated transmit and receive circuitry, including one or more antennas that may be positioned internally relative to the device. In some instances, some or all of the antenna elements may also and/or alternatively be incorporated as part of the housing of the device.

The exemplary wireless communication device can further incorporate one or more controllers, which can help manage the overall operation of the device, including managing the overall operation of the wireless communication capabilities, including the use and determination of an additional maximum power reduction in connection with the wireless communication device.

Figure 3:
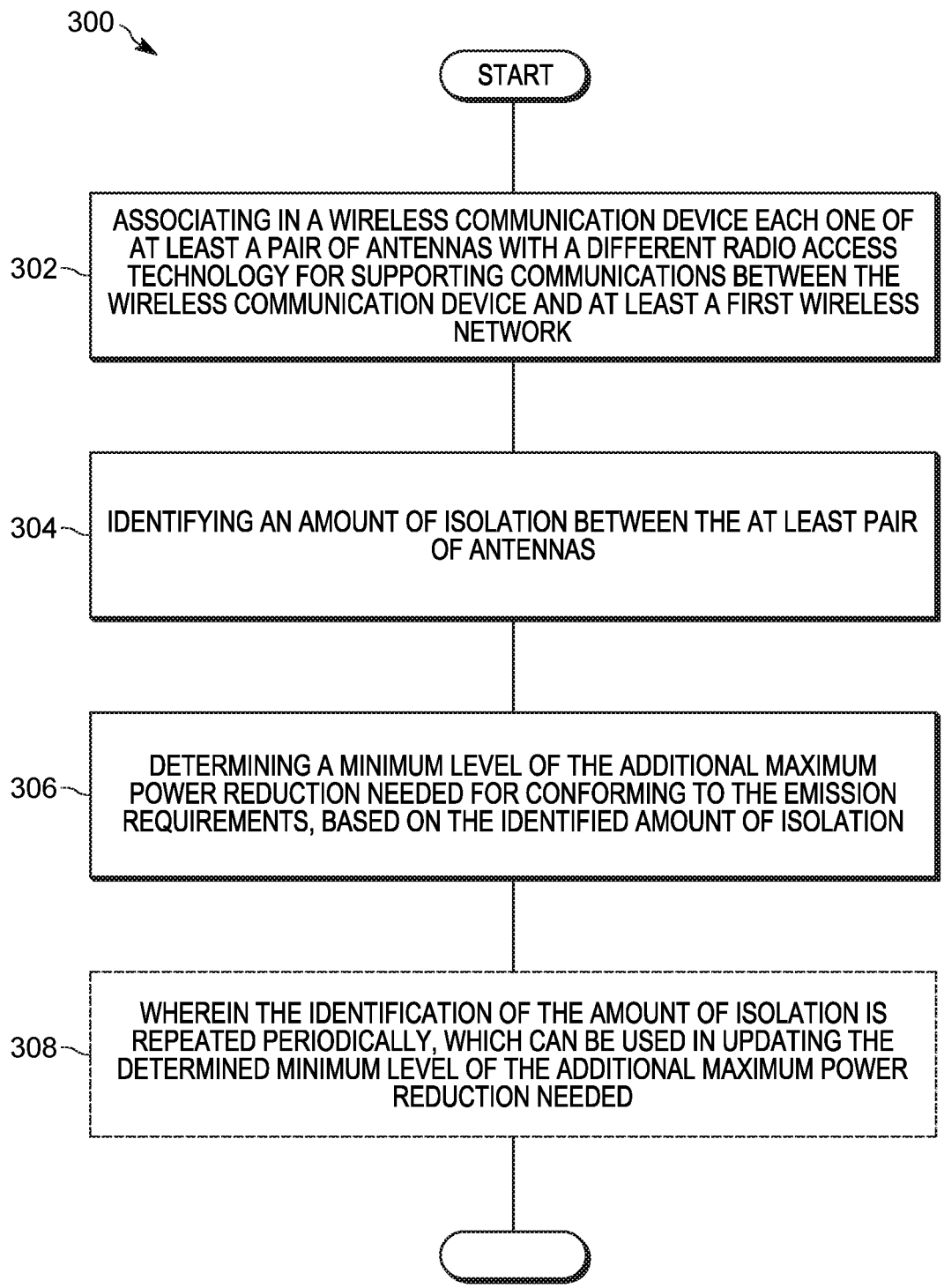
FIG. 3 is a flow diagram of a method for determining an additional maximum power reduction for conforming to emission requirements for dual carrier operation.

FIG. 3 illustrates a flow diagram 300 of a method for determining an additional maximum power reduction for conforming to emission requirements for dual carrier operation. The determining of an additional power reduction as outlined in the illustrated flow diagram could be implemented in support of the wireless communication capabilities of the device. By determining an appropriate respective one or more additional power reductions to be used in connection with one or more signals to be communicated, the power level of the respective signals to be transmitted can be better managed so as to avoid instances in which the transmitted signal can interfere with a signal being simultaneously received, or instances where the transmitted signal will mix with another signal being transmitted in order to produce an intermodulation product outside of either of the intended carrier bands of operation. In at least the illustrated embodiment, each carrier can have an associated respective one of multiple different radio access technologies, and each of the multiple different radio access technologies can use a different antenna.

In at least the illustrated embodiment, the method includes associating 302 in a wireless communication device each one of at least a pair of antennas with a different radio access technology for supporting communications between the wireless communication device and at least a first wireless network. An amount of isolation is identified 304 between the at least pair of antennas. A minimum level of the additional maximum power reduction needed for conforming to the emission requirements is determined 306, based on the identified amount of isolation.

In at least some instances, the identification of the amount of isolation can be repeated periodically, which in turn can be used to update the determined minimum level of the additional maximum power reduction needed.

Figure 4:
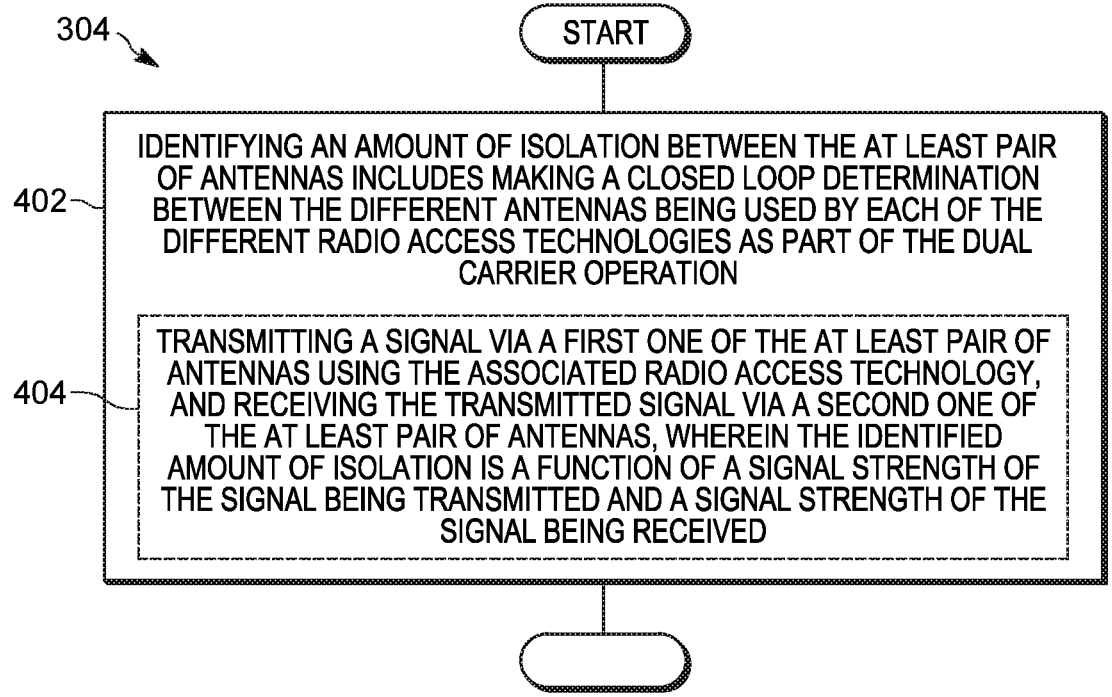
FIG. 4 is a flow diagram of a method for identifying an amount of isolation between the at least pair of antennas.

FIG. 4 illustrates a flow diagram 304 of a method for identifying an amount of isolation between the at least pair of antennas. More specifically, the method outlined in the flow diagram 304 includes identifying 402 an amount of isolation between the at least pair of antennas, which includes making a closed loop determination between the different antennas being used by each of the different radio access technologies as part of the dual carrier operation. Such a closed loop determination can include transmitting 404 a signal via a first one of the at least pair of antennas using the associated radio access technologies, and receiving the transmitted signal via a second one of the at least pair of antennas, wherein the identified amount of isolation is a function of a signal strength of the signal being transmitted and a signal strength of the signal being received.

In at least some instances, the transmitted signal can be received by a feedback measurement receiver. In some of the same or other instances, the feedback measurement receiver can be coupled to the second one of the at least pair of antennas via a signal coupler. Further, when a signal path associated with the second one of the at least pair of antennas includes a diplexer, the signal path includes a selectively enabled bypass switch coupled across the diplexer, wherein the bypass switch is enabled to provide a shunt path across the diplexer, when a closed loop determination is being made.

In some instances, the identified amount of isolation can be stored in a table. Furthermore, the identified amount of isolation can be stored in a table with any detected related use conditions or modes of operation, which are related to the circumstances when the amount of isolation was identified.

Figure 5:
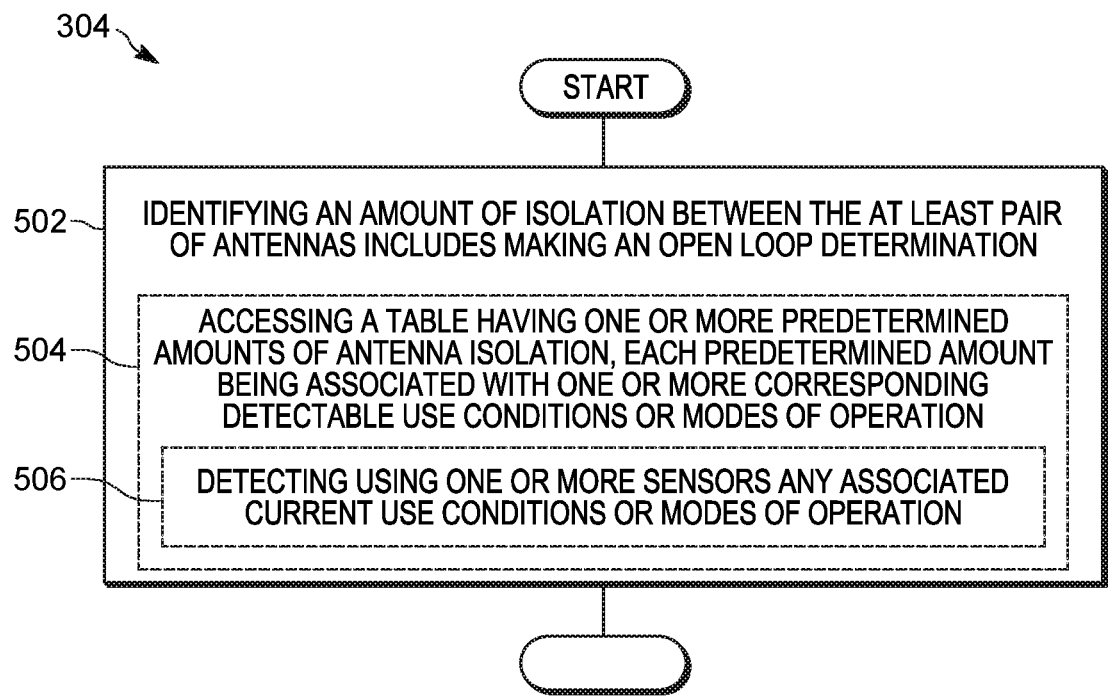
FIG. 5 is a flow diagram of a further method for identifying an amount of isolation between the at least pair of antennas.

FIG. 5 illustrates a flow diagram 304 of a further method for identifying an amount of isolation between the at least pair of antennas. More specifically, the method outlined in the flow diagram 304 includes identifying 502 an amount of isolation between the at least pair of antennas includes making an open loop determination. Such an open loop determination can include accessing a table having one or more predetermined amounts of antenna isolation, each predetermined amount being associated with one or more corresponding detectable use conditions or modes of operation. Making the open loop determination can include detecting using one or more sensors any associated current use conditions or modes of operation.

In at least some instances, the dual carrier operation includes adjacent carriers. Furthermore, the multiple different radio access technologies can include a fourth generation Long Term Evolution (LTE), wherein the wireless communication device communicates with an LTE base station via one of the at least pair of antennas. Still further, the multiple different radio access technologies can include a fifth generation New Radio (NR), wherein the wireless communication device communicates with an NR base station via one of the at least pair of antennas. Further yet, the determined minimum level of the additional maximum power reduction can be communicated by the wireless communication device to the at least first wireless network.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
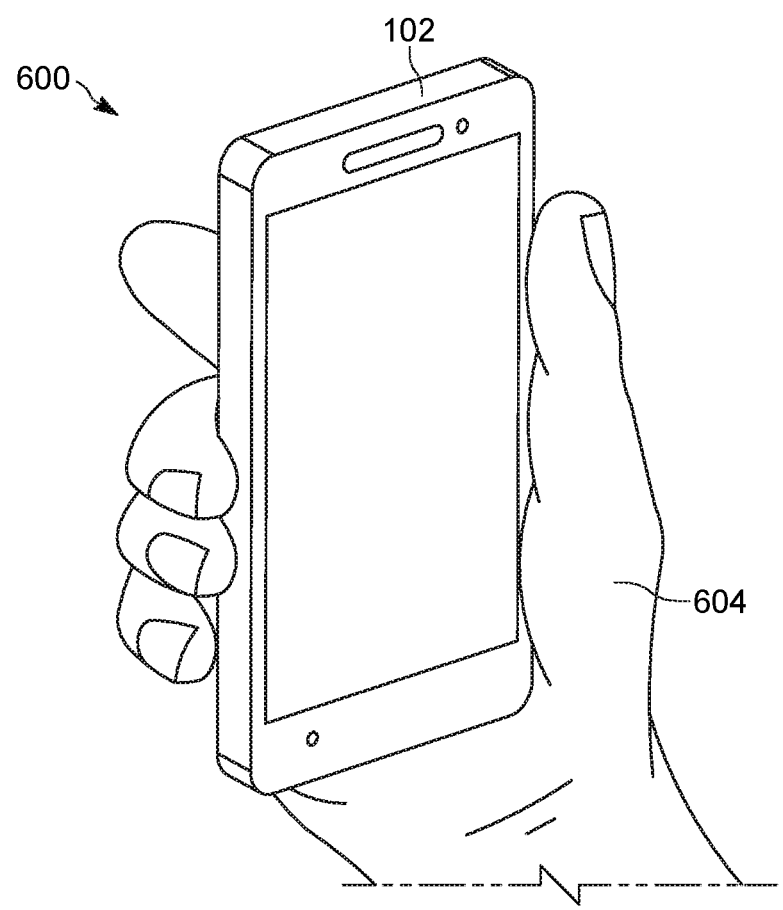
FIG. 6 is an example of a user holding an exemplary device in portrait mode.

FIG. 6 illustrates an exemplary perspective view 600 of a user holding an exemplary device 102 in a portrait use mode or orientation. More specifically, the exemplary device 102 is being held by the hand 604 of a user. Depending upon their location, relative to the device 102, the hand may come into contact and/or proximity to at least some of one or more antennas. As the hand 304 or other element approaches an antenna element, the hand 304 or other element may have an adverse effect on the ability of the antenna to receive or radiate energy, as intended, which in turn can affect the degree of isolation between different pairs of antennas. In some cases, the element coming into contact or proximity with an antenna can cause a detuning of the same. In other instances, the element coming into contact or proximity with an antenna can block or absorb nearby electromagnetic energy being produced by the antenna, and/or intended to be received via the antenna. In a portrait orientation, the device 102 can be more readily brought into proximity of the mouth and ear of the user, so as to more readily facilitate the receipt and conveyance of an audio signal, relative to a microphone and a speaker. However, in turn, this results in the head of the user being additionally brought into relative proximity to the device 102, and potentially one or more of the antennas.

In each instance, these various detected conditions can serve to define one or more use conditions and/or one or more modes of operation, which can be used to associate a particular amount of antenna isolation with the current circumstances of the device. For example, where a closed loop determination of antenna isolation is being determined, the detected amount of antenna isolation could be stored in a table, in conjunction with related circumstances that were present during the detection. Alternatively, as part of an open loop determination, the detected use circumstances can be used to identify a particular one of multiple previously determined and stored antenna isolation amounts, that can then be used in determining an additional maximum power reduction for conforming to emission requirements for dual carrier operation. Each of the previously determined and stored antenna isolation amounts can each be stored as an entry in a table that is indexed using the associated detected use conditions and/or modes of operation.

Figure 7:
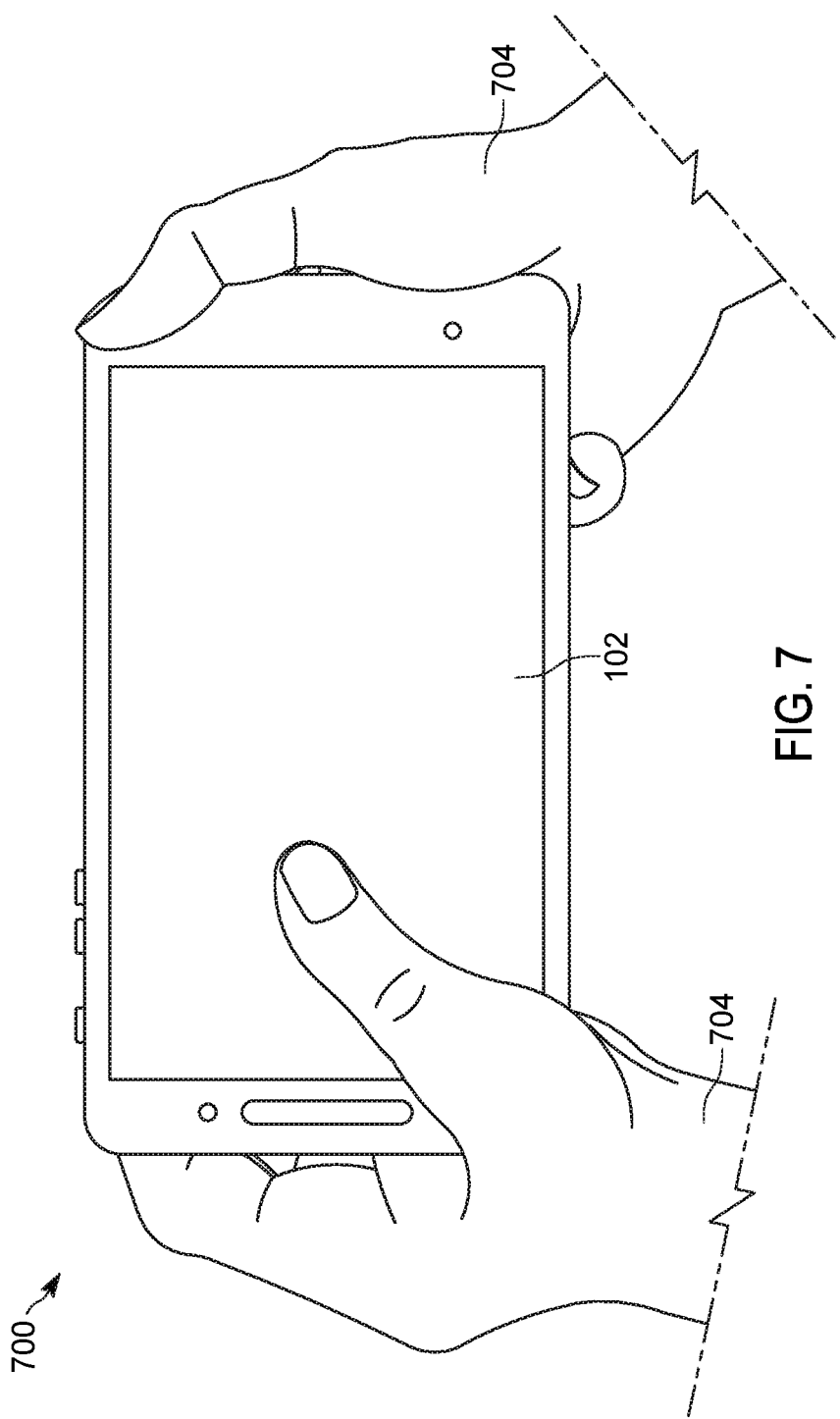
FIG. 7 is an example of a user holding an exemplary device in landscape mode.

A user, however, can interact with a communication device 102 in multiple different ways. For example, a device 102 could be alternatively tilted and held using two hands 704, which could change the portions of the device with which a user's hand 704 might encroach. FIG. 7 illustrates an alternative exemplary perspective view 700 of a user holding an exemplary device 102 in a landscape use mode or orientation, which in turn might be used to identify circumstances associated with a different antenna isolation amount.

Figure 8:
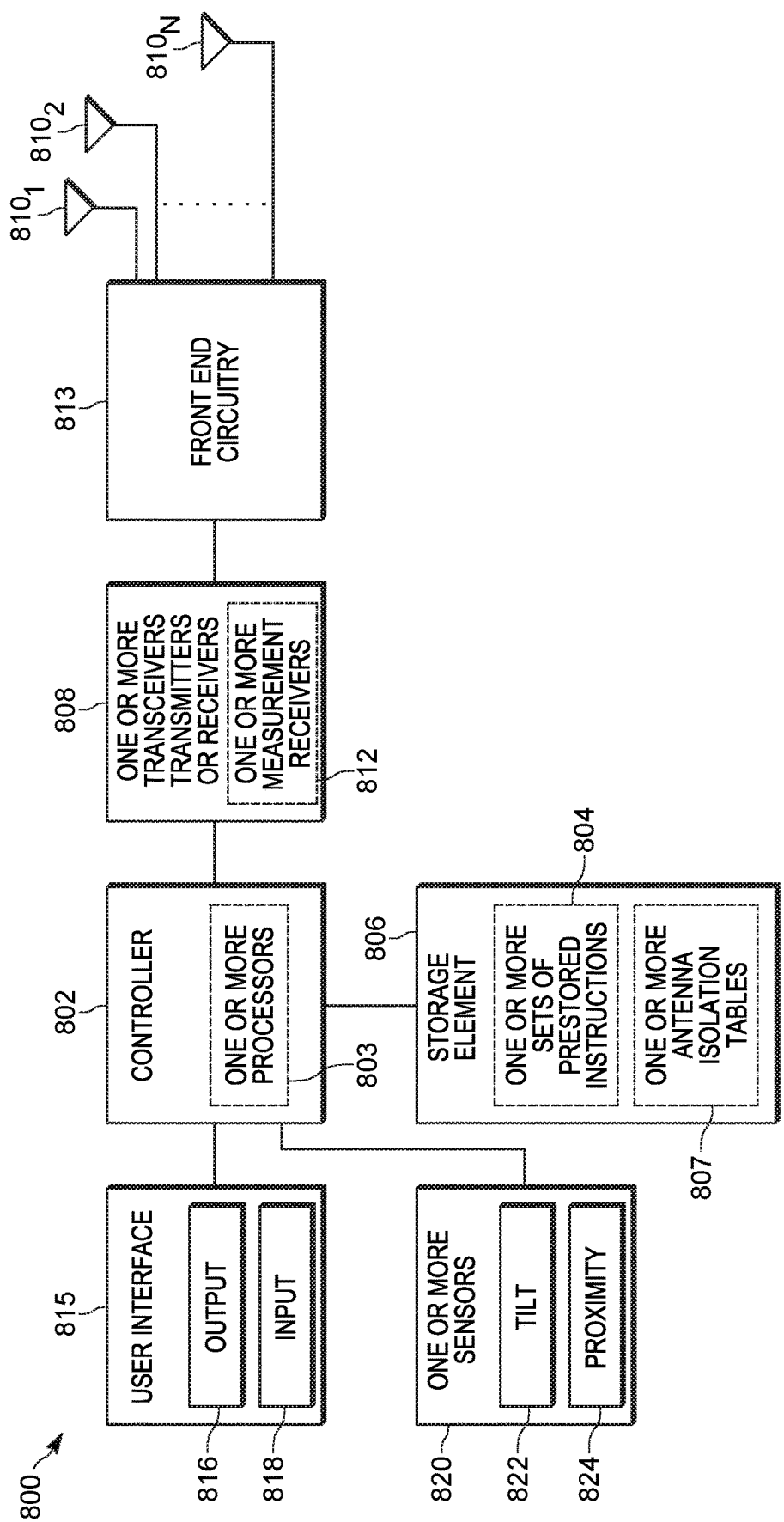
FIG. 8 is a block diagram of an exemplary wireless communication device.

FIG. 8 illustrates a block diagram 800 of an exemplary wireless communication device, in accordance with at least one embodiment. In the illustrated embodiment, the wireless communication device includes a controller 802, which is adapted for managing at least some of the operation of the device. In some embodiments, the controller 802 could be implemented in the form of one or more processors 803, which can each be adapted to execute one or more sets of pre-stored instructions 804, and which may be used to form or implement the operation of at least part of one or more controller modules including those used to manage wireless communication and/or the determination of an additional maximum power reduction for conforming to emission requirements for dual carrier operation. The one or more sets of pre-stored instructions 804 may be stored in a storage element 506, which while shown as being separate from and coupled to the controller 802, may additionally or alternatively include some data storage capability for storing at least some of the prestored instructions for use with the controller 802, that is integrated as part of the controller 802. The storage element can additionally include one or more antenna isolation tables 807 for storing determined antenna isolation values, and/or for later retrieving previously determined antenna isolation values related to a particular use circumstance of interest.

The storage element 806 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory card or stick. One skilled in the art will still further appreciate that still other further forms of storage elements could be used without departing from the teachings of the present disclosure. In the same or other instances, the controller 802 may additionally or alternatively incorporate state machines and/or logic circuitry, which can be used to implement at least partially, some of the modules and/or functionality associated with the controller 802 including all or portions of the claimed methods.

In the illustrated embodiment, the device can further include one or more transceivers, transmitters or receivers 808, which is coupled to the controller 802 and which serves to manage the external communication of data including their wireless communication using one or more forms of communications. In such an instance, the one or more transceivers, transmitters or receivers 808 will each generally be coupled to one or more antennas 810, via which the wireless communication signals will be radiated and/or received. In at least some instances, the one or more transceivers, transmitters, or receivers 808 can include one or more measurement receivers 812, which could be used in detecting a closed loop determination of an amount of antenna isolation between two particular antennas. In the present instance, the one or more transceivers, transmitters or receivers 808 are coupled to the one or more antennas 810 via front end circuitry 813.

The front end circuitry 813 can often include various sub-elements, such as power amplifiers, filters, diplexers, duplexers and switches, which help to facilitate the coupling of a produced signal to an antenna. The front end circuitry 513 can further include impedance matching elements, antenna tuners, and/or additional signal amplifiers, so as to more effectively manage the conveyance of signals between the one or more transceivers, transmitters or receivers 808, and the antenna elements 810.

In the illustrated embodiment, the device can additionally include user interface circuitry 815, some of which can be associated with producing an output 816 to be perceived by the user, and some of which can be associated with detecting an input 818 from the user. For example, the user interface circuitry 815 can include a display 202 adapted for producing a visually perceptible output, which may further support a touch sensitive array for receiving an input from the user. The user interface circuitry may also include a speaker 206 for producing an audio output, and a microphone 208 for receiving an audio input. The user interface output 816 could further include a vibrational element. The user interface input 818 could further include one or more user actuatable switches 204, as well as one or more cameras 210. Still further alternative and additional forms of user interface elements may be possible.

In the illustrated embodiment, the device can still further include one or more sensors 820, which can be used for gathering status information relative to the operating environment as well as the manner in which the device is being used. For example, the one or more sensors 820 can include one or more of tilt sensors 822 and/or proximity sensors 824, which the device can use to detect the usage orientation, as well as the presence of nearby elements proximate the corresponding sensors. In turn, this information can be used to help determine how other elements of the device are controlled including how the antenna isolation is identified for use in determining a particular value for an additional maximum power reduction to be used with the operation of the device in communicating with a particular one of the one or more networks. The use of still further types of sensors are possible in identifying use conditions or modes of operation without departing from the teachings of the present application.

Figure 9:
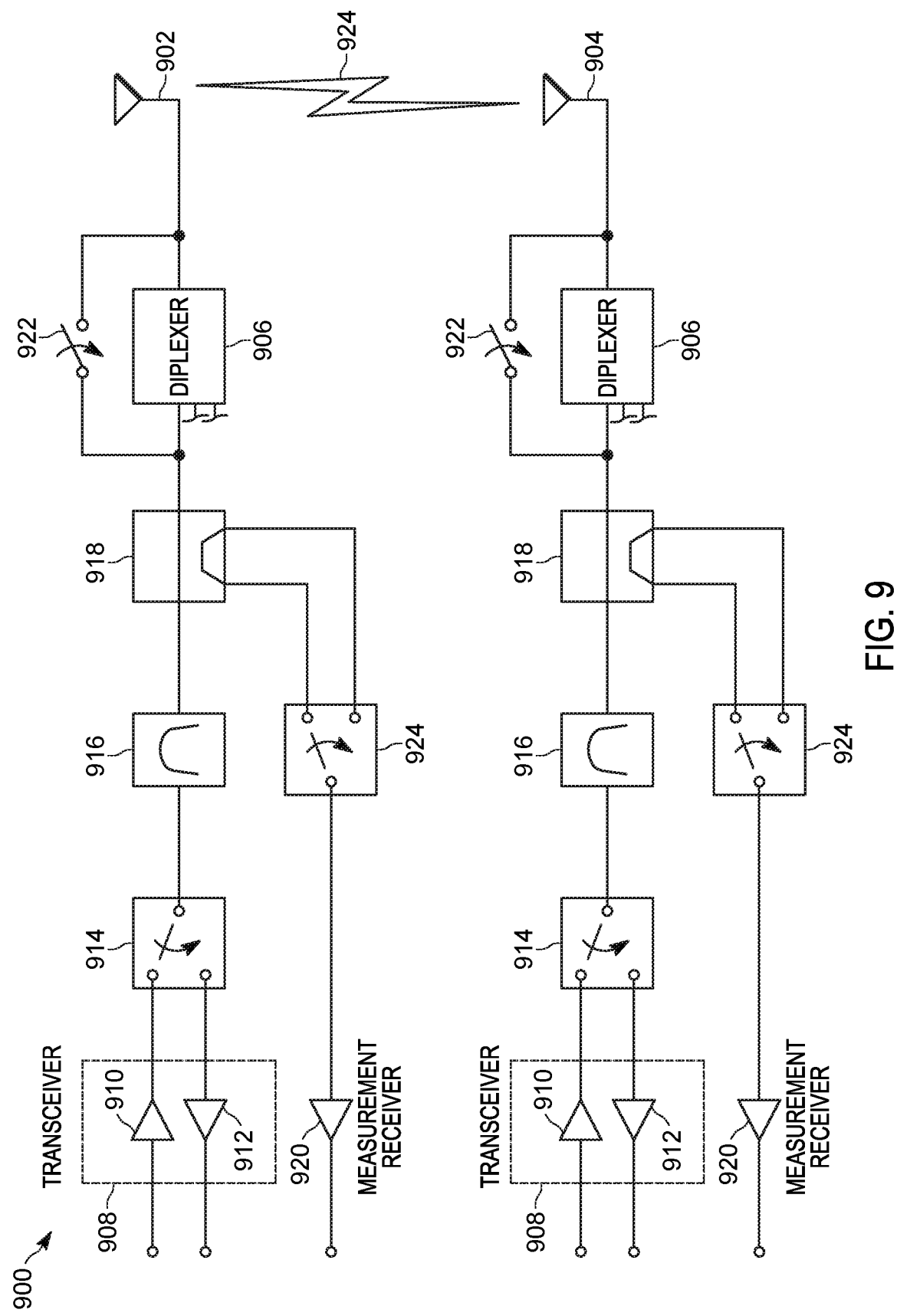
FIG. 9 is a block diagram of a circuit for determining an additional maximum power reduction for conforming to emission requirements for dual carrier operation.

FIG. 9 illustrates a block diagram 900 of a circuit to be used in connection with determining an additional maximum power reduction for conforming to emission requirements for dual carrier operation. More specifically, the block diagram 900 relates to a circuit for use in making a closed loop determination for identifying an amount of isolation between at least pair of antennas 902 and 904.

Each antenna 902 and 904 can be coupled to one or more transceivers, transmitters or receivers 908 via a respective diplexer 906. In the illustrated embodiment, a pair of transceivers are shown, which can each include both a transmitter 910 and a receiver 912. Various combinations of transceivers, transmitters or receivers are possible without departing from the teachings of the present application. However, generally each closed loop path will generally include at least one transmitter and at least one receiver, such that a signal will be transmitted via one of the pair of antennas for which an amount or a level of isolation is being determined.

In the illustrated embodiment, both the transmitter 910 and the receiver 912 portions of the transceiver 908 are alternatively coupled to the antenna 902 or 904 via a switch 914. In the illustrated embodiment, the transceiver 908 is further coupled to the antenna via a filter/amplifier circuit 916, and a bidirectional coupler 918. The bidirectional coupler allows a sampled representation of the signal being sent to or received from the antenna to be conveyed to an alternative signal path associated with a measurement receiver 920. The pair of outputs of the bidirectional coupler corresponding to the sampled signal can be coupled to the input of the measurement receiver 920 via a single throw double pole switch 924. When functioning in a closed loop configuration, it may further be beneficial to close a shunt switch 922, which serves as a bypass for the diplexer 906.

In at least some instances a first path associated with a first antenna 902 may be associated with a first radio access technology, and the second path associated with a second antenna 904 may be associated with a second radio access technology. In at least one embodiment, the radio access technology associated with the first path may be Long Term Evolution LTE, and the radio access technology associated with the second path may be new radio access technology NR. A closed loop measurement related to detecting an amount of antenna isolation between the two antennas can include one of the paths, such as the first path being configured to transmit a signal, and the other one of the paths, such as the second path being configured to receive a signal, such as via the measurement receiver. The controller may need to coordinate the corresponding transmission and reception via the respective paths, so as to avoid instances in which other signals may be known or expected to be present and/or when the affected paths are not being otherwise used. For example, given the bursty nature of LTE/NR packet data, it may be beneficial to employ a scheduling algorithm in the controller, which can allow for times during which both transmitters are not transmitting. This can provide gaps in transmission during which the measurement receiver can be used to measure the isolation between antennas. When the signal is transmitted via the first antenna 902 associated with the first signal path, some of the radiated energy 924 may be picked up by the second antenna 904 associated with the second signal path. The amount of energy that is picked up can be used to determine a corresponding amount of antenna isolation by comparing the known power level at which the signal was transmitted, and the detected power level of the signal that is received. In this way, an amount of antenna isolation can be determined, and then used as part of the computation of an additional maximum power reduction. The amount of determined antenna isolation could also be stored in a table associated with one or more use conditions or operating modes detected when the amount of antenna isolation was being determined.

By using an actual measured amount of antenna isolation, it may be possible to avoid the use of a worst case estimate, and in turn allow for a computed additional maximum power reduction that is not excessively adjusted.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for determining an additional maximum power reduction for conforming to emission requirements for dual carrier operation, each carrier having an associated respective one of multiple different radio access technologies, where each of the multiple different radio access technologies uses a different antenna, the method comprising:
    associating in a wireless communication device each one of at least a pair of antennas with a different radio access technology for supporting communications between the wireless communication device and at least a first wireless network;
    identifying an amount of isolation between the at least pair of antennas; and
    determining a minimum level of the additional maximum power reduction needed for conforming to the emission requirements, based on the identified amount of isolation;
    wherein identifying an amount of isolation between the at least pair of antennas includes making a closed loop determination between the different antennas being used by each of the different radio access technologies as part of the dual carrier operation;
    wherein making a closed loop determination includes transmitting a signal via a first one of the at least pair of antennas using the associated radio access technology, and receiving the transmitted signal via a second one of the at least pair of antennas, wherein the identified amount of isolation is a function of a signal strength of the signal being transmitted and a signal strength of the signal being received; and
    wherein when a signal path associated with the second one of the at least pair of antennas includes a diplexer, the signal path includes a selectively enabled bypass switch coupled across the diplexer, wherein the bypass switch is enabled to provide a shunt path across the diplexer, when a closed loop determination is being made.

2. A method in accordance with claim 1, wherein the transmitted signal is received by a feedback measurement receiver.

3. A method in accordance with claim 2, wherein the feedback measurement receiver is coupled to the second one of the at least pair of antennas via a signal coupler.

4. A method in accordance with claim 1, wherein the identified amount of isolation is stored in a table.

5. A method in accordance with claim 4, wherein the identified amount of isolation is stored in a table with any detected related use conditions or modes of operation.

6. A method in accordance with claim 1, wherein identifying an amount of isolation between the at least pair of antennas includes making an open loop determination.

7. A method in accordance with claim 6, wherein making the open loop determination includes accessing a table having one or more predetermined amounts of antenna isolation, each predetermined amount being associated with one or more corresponding detectable use conditions or modes of operation.

8. A method in accordance with claim 7, making the open loop determination includes detecting using one or more sensors any associated current use conditions or modes of operation.

9. A method in accordance with claim 1, wherein the dual carrier operation includes adjacent carriers.

10. A method in accordance with claim 1, wherein the multiple different radio access technologies includes a fourth generation Long Term Evolution (LTE), wherein the wireless communication device communicates with an LTE base station via one of the at least pair of antennas.

11. A method in accordance with claim 1, wherein the multiple different radio access technologies includes a fifth generation New Radio (NR), wherein the wireless communication device communicates with an NR base station via one of the at least pair of antennas.

12. A method in accordance with claim 1, wherein the identification of the amount of isolation is repeated periodically, which can be used in updating the determined minimum level of the additional maximum power reduction needed.

13. A method in accordance with claim 1, wherein the determined minimum level of the additional maximum power reduction is communicated by the wireless communication device to the at least first wireless network.

14. A circuit for determining an additional maximum power reduction for conforming to emission requirements for dual carrier operation, each carrier having an associated respective one of multiple different radio access technologies, where each of the multiple different radio access technologies uses a different antenna, the circuit comprising:
    at least a pair of antennas;
    a transmitter coupled to a first one of the at least pair of antennas;
    a receiver coupled to a second one of the at least pair of antennas; and
    a controller that identifies an amount of isolation between the at least pair of antenna, and determines a minimum level of the additional maximum power reduction needed for conforming to the emission requirements, based on the identified amount of isolation;
    wherein identifying an amount of isolation between the at least pair of antennas includes making a closed loop determination between the different antennas being used by each of the different radio access technologies as part of the dual carrier operation;
    wherein making a closed loop determination includes transmitting a signal via a first one of the at least pair of antennas using the associated radio access technology, and receiving the transmitted signal via a second one of the at least pair of antennas, wherein the identified amount of isolation is a function of a signal strength of the signal being transmitted and a signal strength of the signal being received; and
    wherein when a signal path associated with the second one of the at least pair of antennas includes a diplexer, the signal path includes a selectively enabled bypass switch coupled across the diplexer, wherein the bypass switch is enabled to provide a shunt path across the diplexer, when a closed loop determination is being made.

15. A circuit in accordance with claim 14, wherein the receiver is a feedback measurement receiver, that is coupled to the second one of the at least pair of antennas via a signal coupler.

16. A circuit in accordance with claim 14, further comprising one or more sensors for detecting one or more current use conditions or modes of operation, and a table having one or more predetermined amounts of antenna isolation, each predetermined amount being associated with one or more corresponding detectable use conditions or modes of operation.

17. A circuit in accordance with claim 14, which is incorporated as part of a wireless communication device.

\* \* \* \* \*